United States Patent
Valiulis et al.

(10) Patent No.: US 6,539,280 B1
(45) Date of Patent: Mar. 25, 2003

(54) MERCHANDISING METHOD AND APPARATUS

(76) Inventors: Carl A. Valiulis, 1426 Harlem Blvd., Rockford, IL (US) 61103; Paul C. Blank, 6422 Marrill Rd., Byron, IL (US) 61010

( * ) Notice: Subject to any disclaimer, the term of this patent is extended or adjusted under 35 U.S.C. 154(b) by 0 days.

(21) Appl. No.: 09/548,255

(22) Filed: Apr. 11, 2000

(51) Int. Cl.⁷ .................. G06F 17/00; G07F 11/00; A01C 9/00; B23Q 7/04
(52) U.S. Cl. .................. 700/236; 700/231; 221/85; 221/217
(58) Field of Search .................. 221/85, 87, 217, 221/218; 700/236, 241, 242, 231

(56) References Cited

U.S. PATENT DOCUMENTS

| | | | |
|---|---|---|---|
| 3,716,165 A | * 2/1973 | Patrick | 221/85 X |
| 3,756,455 A | * 9/1973 | Patrick | 221/85 X |
| 3,757,993 A | * 9/1973 | Bruckner et al. | 221/85 X |
| 3,780,909 A | * 12/1973 | Callahan et al. | 221/85 |
| 3,797,699 A | * 3/1974 | Wittern et al. | 221/85 |
| 6,340,094 B1 | * 1/2002 | Kawamura | 221/87 X |

* cited by examiner

Primary Examiner—Christopher P. Ellis
Assistant Examiner—Gene O. Crawford
(74) Attorney, Agent, or Firm—Lawrence E. Crowe

(57) ABSTRACT

An improved merchandising method, system and apparatus are provided through the use of product displays having a track for aligning product packages in a linear fashion, and an electronic monitoring and transmitting device in the product displays that detects a linear position of one or more product packages with respect to the tracks and generates a signal representing the number of product packages still remaining on the shelf. The signal also preferably includes an identifier code, which may include a universal product identifier code (UPC) or a serial number of the track, that can be utilized to pinpoint the location of that particular track within the store. The signal may be transmitted wirelessly as a radio frequency signal that can be received by antennas permanently installed within the store and connected to an in-store inventory control system and database. Alternatively, the signal may be transmitted by radio frequency to short-range hand-held scanners used by employees as they travel through aisles in the store to inventory the quantity and locations of products on display.

23 Claims, 6 Drawing Sheets

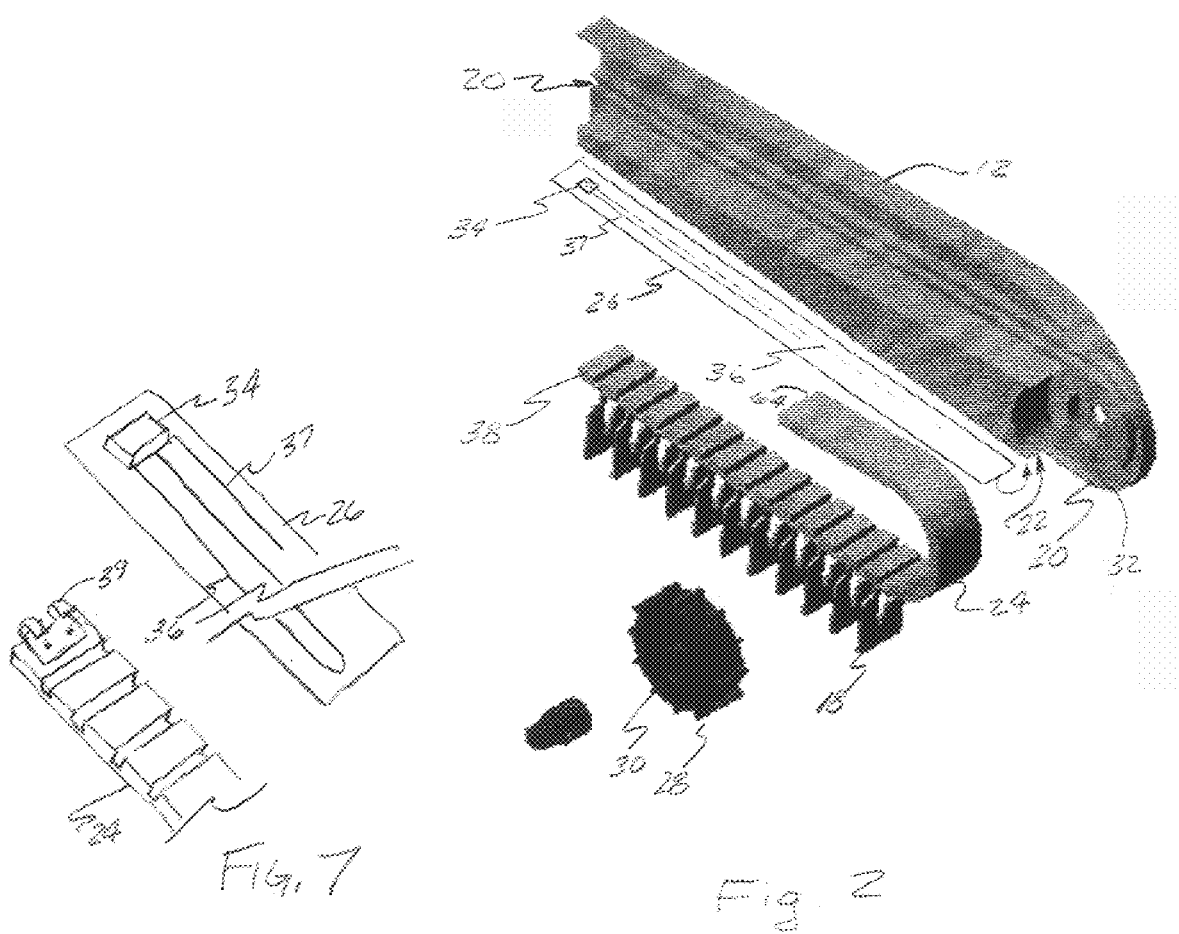

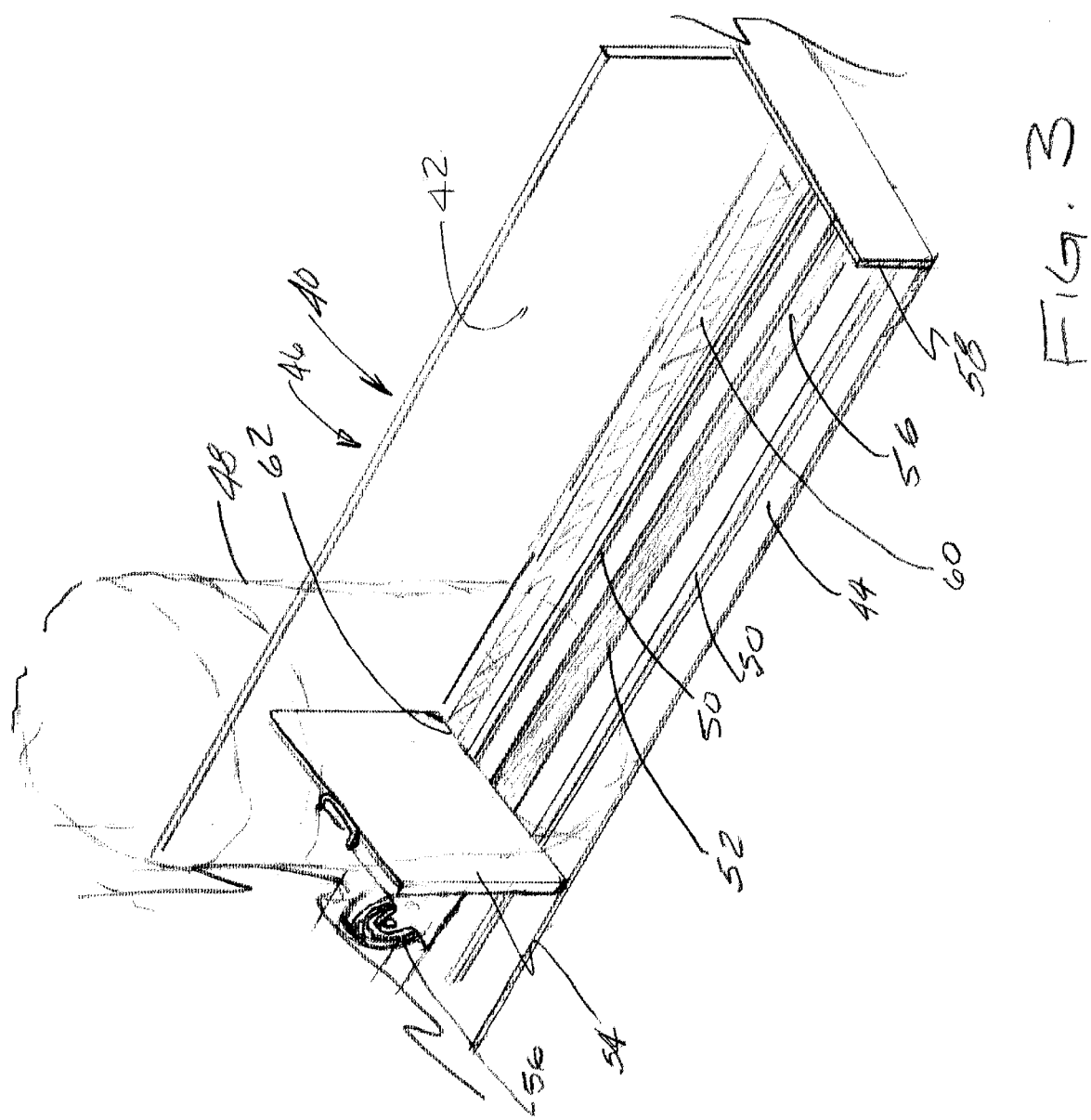

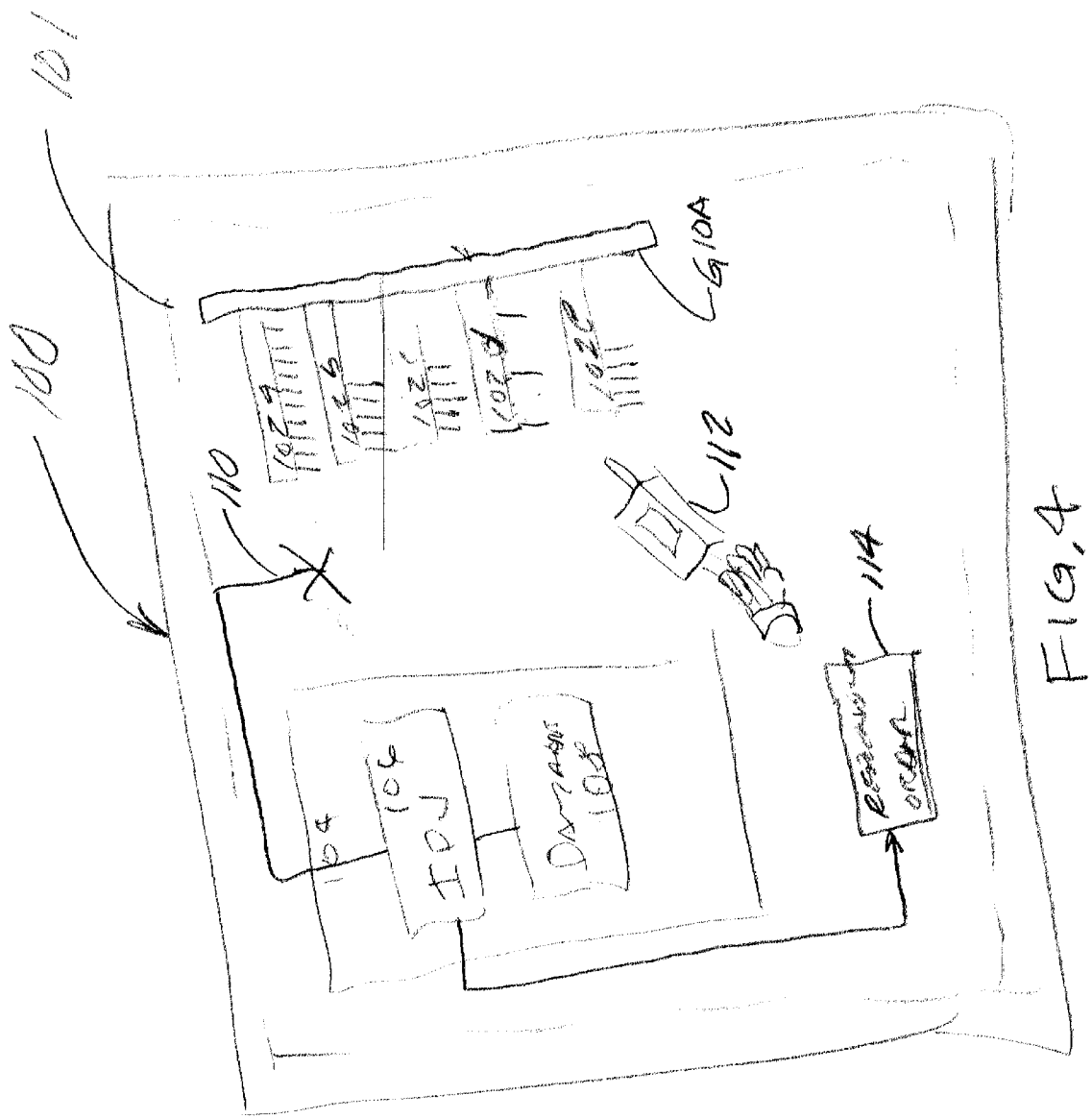

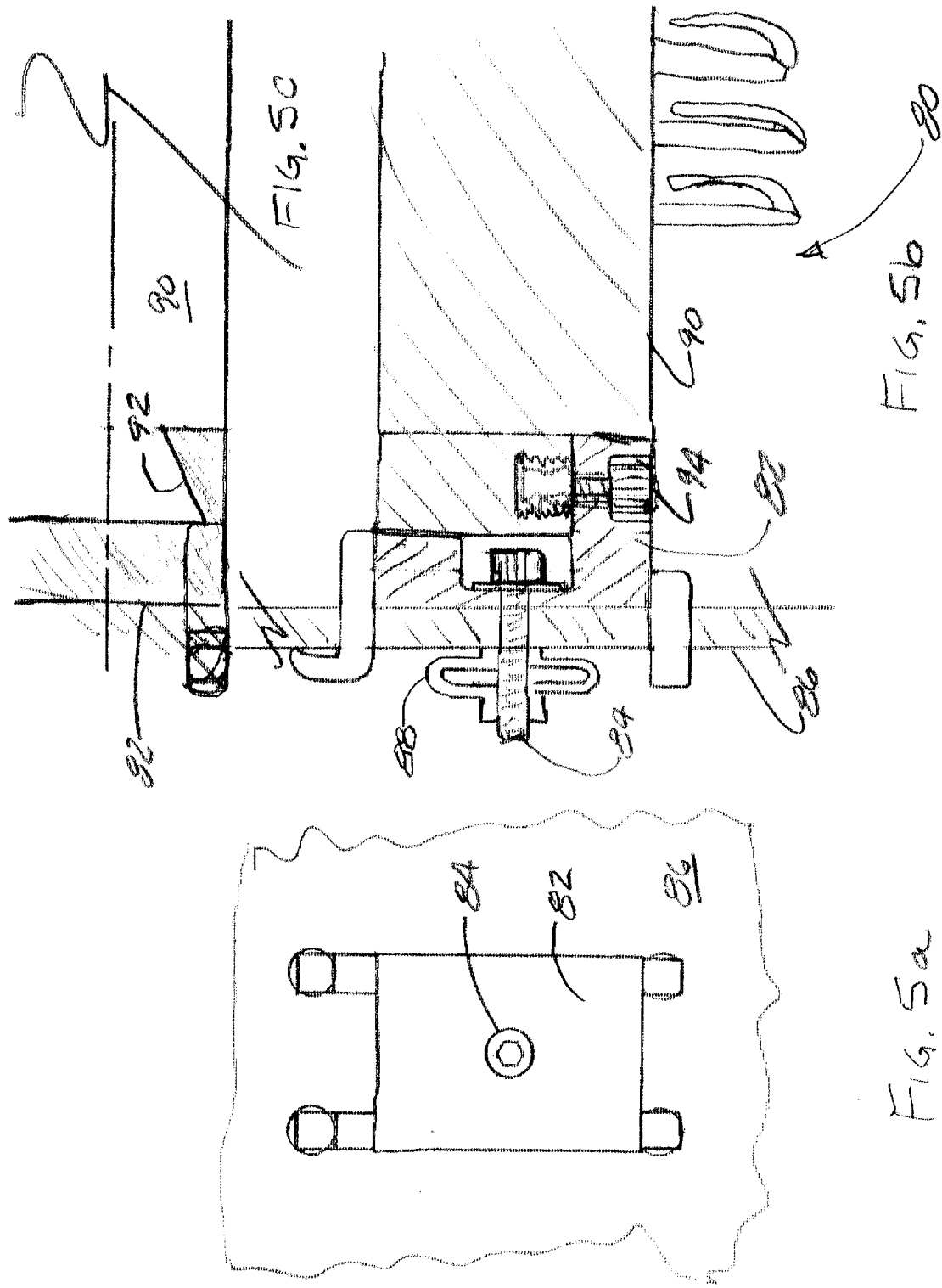

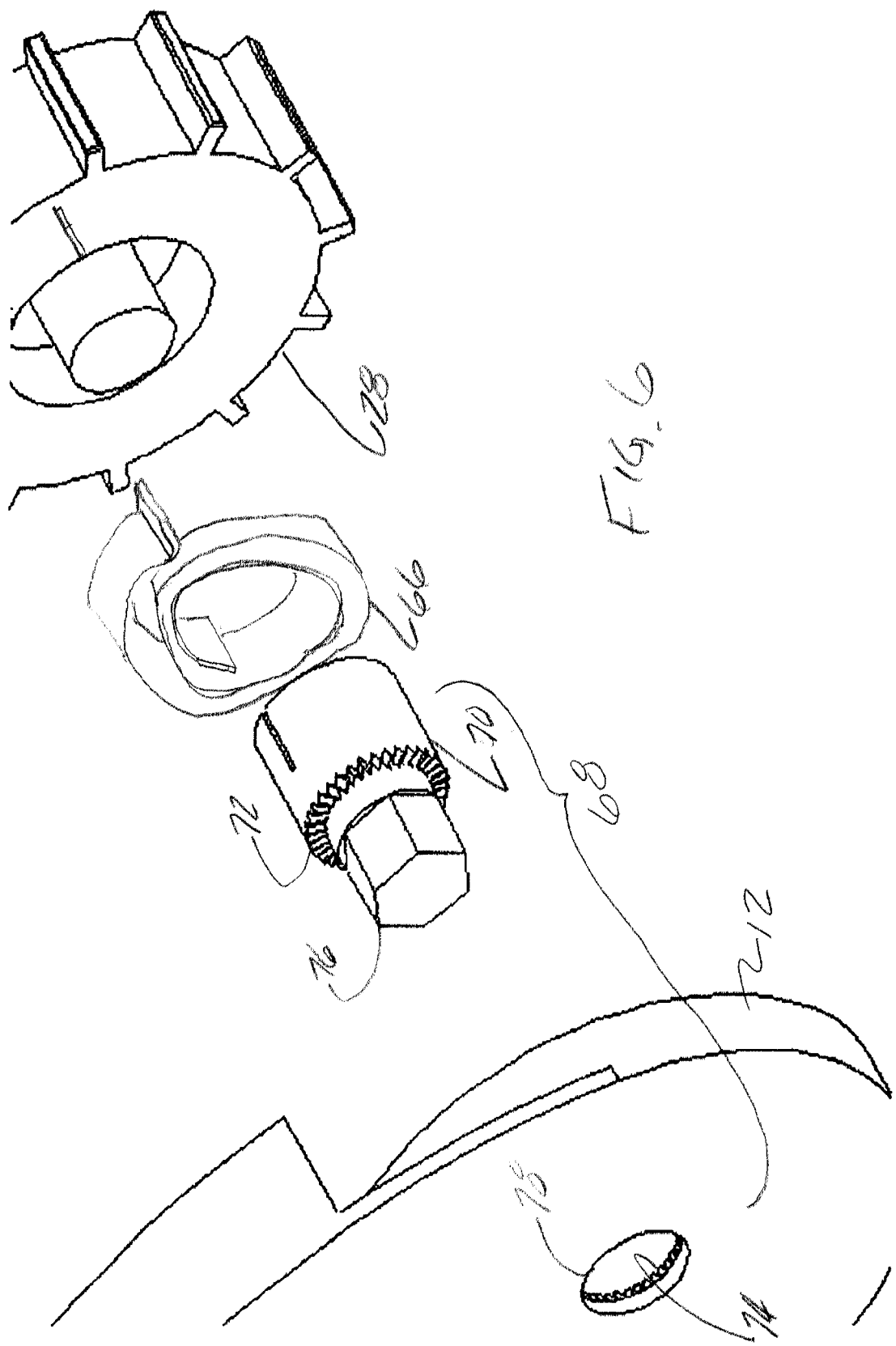

MERCHANDISING METHOD AND APPARATUS

FIELD OF THE INVENTION

This invention relates to systems for displaying and controlling inventory of merchandise or component parts.

BACKGROUND

Consumers today have little loyalty to a particular retail store. They can generally find the brand name products they seek at any one of several stores. They expect retailers to equip and operate their stores in a manner allowing consumers to quickly dash into a store, find the product they seek waiting for them attractively displayed on a shelf or a rack, purchase the product at a very competitive price and be on their way with little interruption to their day.

An empty shelf typically results in a lost sales opportunity for the retailer. If consumers do not find the product they seek on display ready for purchase, they will quickly move on to another retailer. It is imperative, therefore, that a retailer have an inventory control and replenishment system and method that keeps products on display where the consumer can find them.

Keeping prices low necessitates operating a retail store in an effective and efficient manner so that costs associated with sales are minimized. Wages expended in paying employees to monitor inventory and replenish the displays with products are a significant component of the retailer's cost of sales. Employee wages for time spent keeping the displayed product neatly arranged with labels facing the consumer also add to the cost of sales.

Another unfortunate component of the cost of sales for retailers today is the cost of special measures taken to prevent shoplifting. In some cases special security devices having a small electronic circuit that will set off an alarm if removed from the store without the circuit being disabled by a cashier are affixed to individual product packages. For very small items, though, use of such devices on individual packages is impractical or impossible. With such small items there is a risk that enterprising shoplifters will steal not just one item, but the entire display. This risk necessitates designing the displays such that the hangers or racks used to display the product are very difficult to remove, and makes it necessary in some instances to affix electronic security devices to the hangers or racks.

What is needed is an improved merchandising method and associated equipment that keep products attractively displayed for the consumer with minimal expenditures of employee labor for monitoring, replenishing, facing and arranging the product. The method and equipment must also include provisions for controlling shoplifting in a cost effective manner. It is also highly desirable for the merchandising method and equipment to be compatible with methods and equipment already in use by retailers so that initial and life cycle costs of installing and operating the improved method and equipment are minimized.

SUMMARY

Our invention provides such an improved merchandising method and apparatus through the use of product displays having a track for aligning product packages in a linear fashion, and an electronic monitoring and transmitting device in the product displays that detects a linear position of one or more product packages with respect to the tracks and generates a signal representing the number of product packages still remaining on the shelf. The signal also preferably includes an identifier code, which may include a universal product identifier code (UPC) or a serial number of the track, that can be utilized to pinpoint the location of that particular track within the store.

The signal may be transmitted wirelessly as a radio frequency signal that can be received by antennas permanently installed within the store and connected to a central in-store inventory control system and database. Alternatively, the signal may be transmitted by radio frequency to short-range hand-held scanners used by employees as they travel through aisles in the store to inventory the quantity and locations of products on display.

Our improved method and apparatus utilize the signals representing product type, location, and quantity as part of an inventory control and replenishment system that keeps products on the shelf for consumers with less employee labor than is required with prior retail store operating practices.

Some embodiments of our invention include features for automatically facing the product packages with respect to the tracks so that consumers can read the product labels, without employee labor, thereby reducing the employee cost to attractively arrange and maintain the product displays.

Some embodiments of the product display apparatus of our invention include mounting features that lock the tracks into a supporting structure in such a manner that shoplifters will have a very difficult time stealing an entire track and its content.

In highly preferred embodiments of our invention, the electronic device utilized for monitoring linear position of the product and inventory control will also generate a second signal for triggering electronic security devices should a shoplifter attempt to remove a product display track from the store.

These and other aspects, advantages, and novel features of our invention will be readily apparent upon consideration of the following drawings and detailed description of preferred embodiments.

BRIEF DESCRIPTION OF THE DRAWINGS

FIG. 2 is an exploded isometric sectional view of the display track assembly depicted in FIG. 1;

FIG. 3 is an isometric sectional view of another exemplary embodiment of a display track assembly according to our invention;

FIGS. 4 is a schematic representation of an exemplary embodiment of a merchandising system according to our invention;

FIGS. 5a, 5b, and 5c, are depictions of an alternate mounting arrangement for the embodiment depicted in FIGS. 1 and 2;

FIG. 6 depicts yet another alternate embodiment of the display track assembly depicted in FIGS. 1 and 2;

FIG. 7 is a partial enlarged view of an alternate embodiment for operatively connecting the electronic circuit device of FIG. 2 to the belt guiding product packages in the track of the display track assembly.

DETAILED DESCRIPTION

Figure 1:
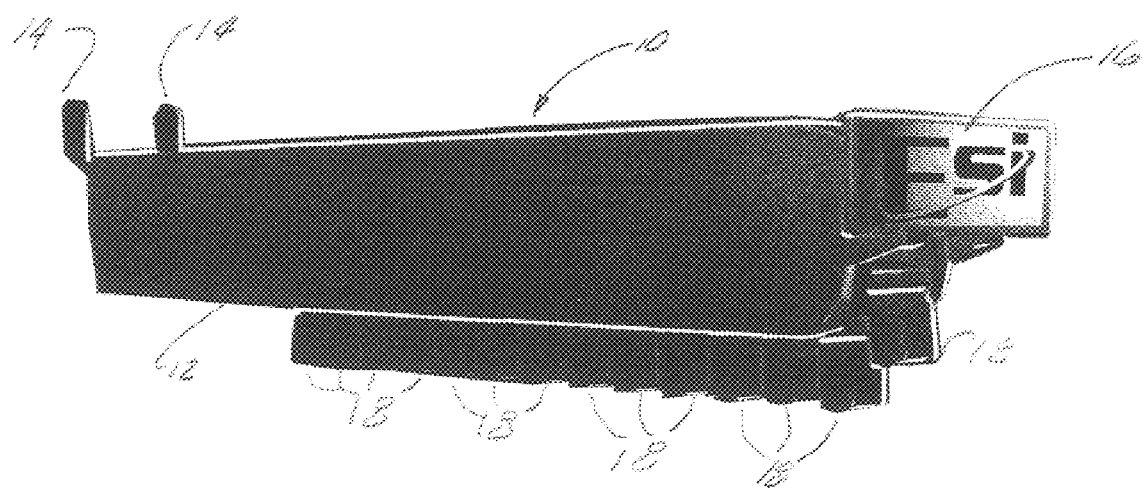
FIG. 1 is an isometric view of one exemplary embodiment of a display track assembly according to our invention.

FIGS. 1 and 2 illustrate an exemplary embodiment of our invention in the form of a display track assembly 10 for supporting articles on a perforated panel of the type commonly referred to as "Pegboard." The display track assembly 10 includes a frame 12 having mounting hooks 14 at a back end thereof for attachment of the display track 10 to the perforated panel. The front end of the frame 12 includes a label holder 16. A plurality of hooks 18 protrude below a lower surface of the display track assembly 10, for attachment of products displayed for sale.

As shown in FIG. 2, the frame 12 defines a U-shaped track 20 for receipt and guidance in a linear fashion of a belt 24 to which the hooks 18 are attached at regularly spaced linear intervals. The frame 12 also defines a surface 22 for attachment of a flexible electronic circuit device 26 adjacent a portion of the track 20 and the belt 24.

At the front end of the frame 12, a bushing or wheel 28 is journaled on axles 30 mounted for rotation in recesses 32 of the frame 12. The bushing or wheel 28 is configured to mate with an inside surface of the belt 24 in a manner facilitating travel of the belt 24 through the U-shaped potion of the track 20.

The flat shape of the attachment hooks 18 oriented at a fixed angle to the belt, and the regular linear spacing of the hooks 18 along the belt 24 help to keep the product neatly displayed with the package labels properly facing the prospective customers and the packages spaced apart rather than bunched together, as often is the case with prior art display devices.

The electronic circuit device 26 includes a microcircuit 34 having first and second traces 36, 37 extending generally parallel to an adjacent portion of the track 20. With the exception of the first extending trace 36, the electronic circuit device 26 is similar in construction to Radio Frequency Identification (RFID) chips, such as those marketed by Single Chip Systems Corporation of San Diego, Calif. for electronic product identification and security systems. These RFID chips have a receiving portion tuned to receive radio frequency energy at a particular receiving frequency. They also include a transmitter portion that will generate and transmit a pre-programmed signal including an identifier code. In operation, when the RFID receiver portion is exposed to the proper frequency of radiation from a scanning device or security station, the RFID will store enough of the received radio frequency energy to reach a power level sufficient to "fire" the transmitter portion and transmit an output signal that includes the identifier code, or triggers a security alarm.

In a display track assembly 10 according to our invention, a portion of the belt 24 includes ferromagnetic core material, or a magnet 38. As the belt 24 is moved along the track 20, the core material 38 moves along and adjacent to the first extending trace 36 of the electronic circuit device 26. The electronic circuit device 26 is configured such that the position of the core material 38 on the belt 24 with respect to the first extending trace 36 alters an internal electrical parameter, such as impedance, capacitance, or resistance, of the microcircuit 34 in a manner that tunes a receiver portion of the electronic circuit device 26 to receive a distinct predetermined frequency at each incremental position of the belt 24 with respect to the track 20.

In operation, the display track assembly 10 is mounted on a product display using the hooks 14, and loaded with product by attaching packages to the hooks 18. The hooks 18 are configured with very little clearance between the bottom of the frame 12 and the top edge of the package being hung on the hooks 18. This small clearance makes it virtually impossible to remove more than one product package at a time. A prospective customer must remove the product packages one at a time from the front end of the frame 12.

In the process of removing each product package, the customer pulls the belt 24 toward the front of the frame 12. Once a product package is removed, the weight of the remaining packages still attached to the belt 24 by the hooks 18 will cause the belt 24 to remain in the same linear position with respect to the track 20.

As each product package is removed, the customer pulls the belt 24 an incremental distance forward in the track 20 and changes the position of the magnetic material 38 in the belt 24 with respect to the track 20 and the first extending trace 36. This change in position of the magnetic material 38 with respect to the first extending trace 36 tunes the receiver section of the electronic circuit 34 to a different receiving frequency for each incremental position of the belt 24.

The receiving frequency at each incremental position is predetermined by the linear spacing of the hooks 18 along the belt 24 and the design of the microchip circuit 34. As the customer pulls the belt 24 forward in the process of sequentially removing product packages from each hook 18, the electronic circuit device 26 will be sequentially tuned to a predetermined known set of receiving frequencies, with the number of frequencies in the set equaling the number of hooks 18 on the belt 24.

To determine the number of packages still on display at any point in time, the display apparatus 10 is scanned by exposing the electronic circuit device 26 to a range of radio frequencies encompassing the set of incremental frequencies associated by design with each possible incremental position of the belt 24. When the scan reaches the particular receiving frequency matching the present linear position of the belt 24, the microcircuit 34 will charge up and transmit an output RF signal to the scanner including an identifier code unique to the particular display apparatus 10 being scanned.

The receiving frequency at which the electronic circuit device 26 responds is a direct indicator of the linear position of the belt 24 in the track 20. By comparing the response frequency to the set of incremental frequencies matching each incremental position of the belt 24 as product is removed, the amount of product remaining on this particular display track assembly 10 can be determined. The unique identification code transmitted within the response signal makes it possible to determine which display track assemblies 10 are responding to a particular receiving frequency, when there is more than one track assembly 10 located within range of the scanner.

In some applications of our invention, it may be desirable to utilize an alternate method of operatively connecting the belt 24 to the first track 36 of the electronic circuit device 26. As shown in FIG. 7, the ferro magnetic core material or magnet 38 as described above can be replaced by an electrical contact 39 attached to the belt 24 which contacts and shorts across the legs of the first trace 36, thus shortening the length of the loop and performing the same function as the core material 38 in tuning the RF receiving frequency of the electronic circuit device as the belt 24 moves within the track 20.

FIG. 3 illustrates an embodiment of our invention applicable for use with products that are typically displayed sitting on a shelf, such as cans of spray paint or deodorant, rather than hanging from hooks as described with respect to the embodiment of FIGS. 1 and 2. An upward opening U-shaped channel 40 having a pair of vertical walls 42 (only one of which is shown in FIG. 3 for clarity of illustration) connected by a horizontally extending bottom wall 44 define a track 46 for displaying products, indicated by dashed lines 48, in a linear fashion. The bottom wall 44 includes a pair of raised rails 50 for supporting the displayed products in a manner reducing the sliding contact between the bottom wall 44 and the displayed product. Preferably, these rails 50 would be made from a material having a low coefficient of friction.

The bottom wall 44 further includes a guide track 52 for receipt of an axial positioning device in the form of a pusher plate assembly 54. The pusher plate assembly 54 includes a coiled spring 56 having one end attached to the pusher plate assembly 54 and the other end attached to the front end of the track 46. The spring extends from the pusher plate assembly 54 to the front end of the U-shaped channel 40 within the guide track 52, and serves to pull the products on display toward the front end of the channel 40 where they can be conveniently seen and removed from the track 46 by a customer. A stop 58 holds the displayed product in the track 46 against the force of the spring 56.

An electronic circuit device 60, similar in construction and operation to the electronic circuit device 26 of the embodiment shown in FIGS. 1 and 2, is attached to the bottom wall 44 of the track 46 for sensing the linear position of the pusher plate assembly 54 with respect to the track 46. A portion 62 of the pusher plate assembly 54 adjacent the electronic circuit device 26 is constructed of electromagnetic core material, so that as the pusher plate assembly 54 moves incrementally along the track 46 with the removal of the displayed product, the receiving frequency of the electronic circuit device 60 is incrementally tuned in the same fashion as described above with respect to the embodiment of FIGS. 1 and 2.

Operation of the embodiment of our invention depicted in FIG. 3 is the same as operation of the embodiment of FIGS. 1 and 2 previously described above, with the exception that the displayed product is now sitting in the track 46 rather than hanging from the track 20.

FIG. 4 shows a merchandising system 101 according to our invention. A store 100 is furnished with a plurality of product display track assemblies of the type described above in conjunction with FIGS. 1–3. For illustrative purposes five display track assemblies having identification numbers 102*a–e* are illustrated, mounted on the same display gondola positioned within the store 100 at a hypothetical location G10*a*. Of these illustrative display assemblies, display assemblies 102*a, b,* and *c* each hold 10 product packages when fully loaded. Product display track assemblies 102*d* and 102*e* hold 4 and 7 product packages respectively, when fully loaded.

The store 100 is equipped with an inventory control system 104 having an inventory processing unit 106 which includes an inventory database 108. An antenna system 110 receives transmissions from handheld scanner units 112 that are used by employees walking down the aisles of the store to query the display track assemblies 102*a–e* and transmit the information received from display track assemblies 102*a–e* to the inventory processing unit 106 via the antenna system 110. The inventory processing unit 106 compares the data received from the scanner 112 to stored data showing the capacity, location, and product displayed on each product display track assembly 102*a–e*, calculates the quantity of product packages needed to replenish each display track assembly 102*a–e*, and issues a replenishment order 114 listing the quantity of each product needed to replenish each of the display track assemblies 102*a–e*.

The following tables illustrate in more detail the manner in which the merchandising system specifically illustrated in FIG. 4 operates.

As illustrated in FIG. 4 and described above, the capacity and current inventory of the product display assemblies is tabulated in the following Table 1:

| Display Track ID # | Capacity | Current Inventory |
|---|---|---|
| 102a | 10 | 10 |
| 102b | 10 | 5 |
| 102c | 10 | 5 |
| 102d | 4 | 3 |
| 102e | 7 | 5 |

When scanned at the proper receiving frequency matching the current inventory quantity, the electronic circuit devices 26,60 of the display track assemblies 102*a–e* will charge up and transmit a signal including the display track ID number to the scanner 112. The scanner 112 collates and amplifies the signals received from the display track assemblies 102*a–e*, and transmits the collated information to the inventory processing unit 106. The information received and re-transmitted by the scanner 112 is tabulated in the following Table 2:

| Receiving Frequency | Responding Display Track ID # |
|---|---|
| $f_1$ | — |
| $f_2$ | — |
| $f_3$ | 102d |
| $f_4$ | — |
| $f_5$ | 102b; 102c; 102e |
| $f_6$ | — |
| $f_7$ | — |
| $f_8$ | — |
| $f_9$ | — |
| $f_{10}$ | 102a |

The inventory processing unit 106 compares the information received from the scanner 112 with information stored in the database 108, and calculates the quantity of each product needed to replenish the display tracks 102*a–e* as illustrated in the following Table 3:

| Display Track ID # | Location in Store | Capacity | Current Inventory | Replenish Quantity | Product ID |
|---|---|---|---|---|---|
| 102a | G10A | 10 | 10 | 0 | W |
| 102b | " | 10 | 5 | 5 | W |
| 102c | " | 10 | 5 | 5 | X |
| 102d | " | 4 | 3 | 1 | Y |
| 102e | " | 7 | 5 | 2 | Z |

The inventory processing unit 106 then generates a replenishment order from the information in Table 3 that can be utilized for drawing the needed product from stock and replenishing the display tracks 102*a–e*. In the example utilized, only five display tracks were utilized for simplicity of explanation, but those skilled in the art will readily recognize that the apparatus and methods of our invention as applied to this simple example can be expanded to encompass the thousands of products on display on hundreds of display devices in a typical modern variety store.

FIGS. 5*a–c* illustrate an alternate embodiment of the display track assembly depicted in FIGS. 1 and 2, wherein the frame has been modified to include a two piece design that locks into a perforated panel to thwart a potential shoplifter from stealing the entire display track and its content. The modified display track assembly 80 includes a mounting bracket 82 having a locking screw 84 that extends through the perforated panel 86 and draws a locking toggle 88 against the back side of the perforated panel 86 so that once installed and locked in place, the mounting cannot be removed without loosening the screw 84 and releasing the toggle 88. A track portion 90 of the modified track assembly 80 includes a dovetail section 92 and a locking screw 94 that insert into and secure the track portion 90 in corresponding features of the mounting bracket 82.

In a preferred embodiment of our invention, the second extending trace 37 of the electronic circuit device 26,60 is utilized as a fixed frequency antenna in conjunction with conventional electronic security devices, so that an attempt to remove the track assembly from the store will trigger a security alarm unless the electronic circuit device is first deactivated. Our invention also contemplates that this fixed frequency function be utilized to identify the track assemblies by triggering them to transmit their identification codes when scanned at the appropriate frequency.

From the foregoing description, those having skill in the art will readily recognize that a merchandising method, system, or apparatus according to our invention provide significant advances over prior merchandising methods, systems, and apparatuses. Those skilled in the art will further recognize that although we have described the invention herein with respect to certain specific embodiments and applications thereof, many other embodiments and applications are possible within the scope of our invention as described in the appended claims.

For example, although the exemplary embodiment illustrated in FIGS. 1 and 2 did not include a coiled spring device for moving the displayed product toward the front of the track, as was shown by the embodiment of FIG. 4, such a spring device can readily be incorporated into the embodiment of FIGS. 1 and 2. Certainly those having skill in the art will recognize that a coil spring similar to the one shown in FIG. 4 can be attached to an upper end 64 of the belt, as seen in FIG. 2, for aiding the customer in pulling the belt through the track 20 as each product package is removed. Alternatively, as shown in FIG. 6, a coiled spring mechanism 66 can be operatively attached between the wheel 28 and the frame 12 to pull the belt 24 through the track 20.

The embodiment depicted in FIG. 6 also includes an adjustable clutch assembly 68 for adjusting the spring tension in the coil spring 66 to match what is required for different types of product packages of lighter or heavier weight. The clutch assembly 68 includes a stub axle 70 configured to mate operably between an axle 30 of the wheel 28 and the frame 12. An end of the stub axle 70 opposite the wheel 28, and a mating surface of the frame 12 include a series of interlocking clutch teeth 72, 74 which when engaged prevent the stub axle from turning relative to the frame 12. A thrust spring or washer (not shown) disposed between the stub shaft 70 and the wheel 28 urge the clutch teeth 72 of stub shaft 70 into engagement with the clutch teeth 74 of the frame 12. The stub shaft 70 includes a hexagonal shaped portion 76 configured to mate with an adjustment tool (not shown). The hexagonal portion 76 extends through a hole 78 in the frame 12 so that it can be accessed externally by the adjustment tool. To adjust the spring tension, the adjustment tool compresses the thrust spring or washer to disengage the clutch teeth 72, 74, and the stub shaft 70 is rotated while holding the belt 24 in its fully extended position, that is to say the position the belt 24 will be in when all of the hooks 18 are fully loaded with product.

When the desired spring tension is achieved, the adjustment tool is backed out of the hole 78 allowing the thrust spring or washer to push the clutch teeth 72,74 back into engagement, with the clutch 68 thereby holding the spring tension at the desired level.

Those skilled in the art will readily recognize that although our exemplary embodiments utilized a hand held scanner similar to those in use today for scanning the product display tracks and transmitting the information received to an antenna connected to an inventory processing unit, these hand held scanners can be eliminated by incorporating a battery or other power source into the electronic control devices of our invention. These devices would then posses enough internal power to transmit a signal detectable by the antenna 110 and a central scanning unit included in the inventory control unit 104. Because the electronic circuit devices in the product display track assemblies transmit only in short bursts when queried, batteries would be expected to last for long periods of time.

Those having skill in the art will also recognize that our invention could be practiced utilizing elements connected via wires rather that by RF signals as in the exemplary embodiments.

The microcircuit chips can also be programmed to perform the calculation of replenishment quantity locally, and transmit the quantity needed along with the identifier code when queried, thereby simplifying the operations that need to be performed by the remote inventory control unit. This embodiment also allows a hand held scanner to receive a local readout of what quantity of products is required, as an alternate or a backup to the replenishment order generated by the remote inventory processing unit.

We contemplate that there may be some applications of our invention in which a simplified version of our display track apparatus may be preferred, wherein the electronic monitoring and transmitting device only detects and transmits a replenishment request at a single predetermined minimum stock condition, rather than monitoring the remaining product packages guided by the track. In this embodiment, only those tracks that are at or below their predetermined level would respond to a scan at the RF receiving frequency.

Although the track shown in the embodiment of FIGS. 1 and 2 is U-shaped, flat tracks, circular tracks, continuous tracks, and in general tracks of all shapes can be utilized within contemplated scope of our merchandising method, system, and apparatus.

In like fashion, although the hooks in the embodiment of FIGS. 1 and 2 are fixed to the belt at an angle generally perpendicular to the direction of travel of the belt within the track, so that all packages hanging therefrom would face a prospective customer looking at the rack, the hooks could be attached at other angles to the direction of travel to create a neat and pleasing appearance to the customer in displays of non-forward facing packages, or where an angled display would be more pleasing or space efficient.

We wish to expressly state that, although the exemplary embodiments described herein are directed to the practice of our invention in a retail merchandising application, we contemplate many other applications of our invention in other types of inventory control systems. Specifically, we contemplate that these other applications might include but not be limited to wholesale or mail order sales, industrial stockroom operations by an OEM, and work cell or CANBAN manufacturing stations.

It is understood, therefore, that the spirit and scope of the appended claims should not be limited to the specific embodiments described and depicted herein.

We claim:

1. A product display apparatus comprising:
   a frame having mounting hooks at one end thereof for attachment of said product display apparatus to a perforated panel and defining a U-shaped track for guiding product packages in a linear path;
   said track having an upper leg disposed vertically above a lower leg and joined by a U-shaped section at a distal end of said frame;
   a belt slidably mounted within and guided by said track and having a plurality of hooks depending below said lower leg of said track for attachment of product packages;
   a spring for reducing the force required for moving said belt through said track; and
   a spring force adjusting device in the form of a clutch;
   said clutch including:
      an axle affixed to said wheel;
      a stub shaft operably connected operably between said axle and said frame allowing said axle to rotate relative to said stub shaft, and allowing said stub shaft to move along said axle away from said frame;
      an end of said stub shaft adjacent said frame and a mating surface of said frame including interlocking clutch teeth;
      a thrust device disposed between said wheel and said stub shaft for urging said clutch teeth on said stub shaft into engagement with said clutch teeth on said frame;
      said coil spring having one end attached to said wheel, and a second end attached to said stub shaft and coiled in a direction urging movement of the hooks on the belt along the lower leg of the track toward the distal end of the frame;
      said stub shaft further including a hexagonal portion thereof extending through a hole in said frame for external access by an adjustment tool configured to engage the hexagonal portion while compressing the thrust spring to disengage the clutch so that the tool may be used to adjust the tension in the coil spring by turning the stub shaft relative to said wheel.

2. A product display apparatus comprising:
   a frame having mounting hooks at one end thereof for attachment of said product display apparatus to a perforated panel and defining a U-shaped track for guiding product packages in a linear path;
   said track having an upper leg disposed vertically above a lower leg and joined by a U-shaped section at a distal end of said frame; and
   a belt slidably mounted within and guided by said track and having a plurality of hooks depending below said lower leg of said track for attachment of product packages;
   wherein the mounting means is detachable from the frame.

3. A product display apparatus comprising:
   a frame defining a track and having mounting means at one end thereof for attachment of said product display apparatus to a panel;
   said track having a first leg spaced from and extending generally parallel to a second leg and joined by a U-shaped section at a distal end of said frame, said first leg, second leg, and U-shaped section of said track defining a length of said track; and
   a belt having a length shorter than said length of said track slidably mounted within and guided by said track for reciprocating motion in said track, and having means for attachment of product packages;
   said belt extending around the U-shaped section of the track and having a first end of said belt disposed in the first leg, and a second end of said belt disposed in the second leg.

4. The product display apparatus of claim 3 wherein the mounting means comprise mounting hooks adapted for attachment of said product display apparatus to a perforated panel.

5. The product display apparatus of claim 3 wherein the frame is comprised of a first and a second side.

6. The product display apparatus of claim 3 wherein the track has an upper leg thereof disposed vertically above a lower leg thereof and joined by a U-shaped section at a distal end of said frame.

7. The product display apparatus of claim 3 further including a wheel journalled in the frame and having an outer surface of the wheel contoured for contacting and guiding the belt through a portion of the track.

8. The product display apparatus of claim 3 wherein the sole motive force for moving the belt through the track is provided by manual human effort.

9. The product display apparatus of claim 3 wherein the means for attachment of product packages includes means for suspending the product packages below the belt when the product display apparatus is attached to the panel.

10. The product display apparatus of claim 9 wherein the means for attaching product packages includes one or more hooks extending from the belt and adapted for suspending the product packages below the belt.

11. The product display apparatus of claim 3 wherein the means for attaching product packages includes one or more hooks extending from the belt and adapted for receiving the product packages.

12. The product display apparatus of claim 11 wherein said hooks are attached to said belt at regularly spaced linear intervals and at a fixed angle relative to said track, to thereby hold product packages attached to the hooks in a regularly spaced neatly appearing fashion with all product packages being uniformly faced at a uniform angle to said track.

13. A product display apparatus comprising:
   a frame having mounting hooks at one end thereof for attachment of said product display apparatus to a perforated panel and defining a U-shaped track for guiding product packages in a linear path;
   said track having an upper leg disposed vertically above a lower leg and joined by a U-shaped section at a distal end of said frame;
   a belt slidably mounted within and guided by said track and having a plurality of hooks depending below said lower leg of said track for attachment of product packages; and
   an electronic monitoring and transmitting device operably connected to said track;
   said electronic monitoring and transmitting device including a receiving circuit having an RF receiving frequency thereof variable in a discrete predetermined correspondence to a quantity of product packages guided by said track when said RF receiving frequency is detected by said receiving circuit;
   said electronic monitoring and transmitting device also including a transmitting circuit generating an output signal when said RF receiving frequency is detected by said receiving circuit.

14. The product display apparatus of claim 13 wherein:

said electronic monitoring and transmitting device further includes a trace extending along a portion of said track; and a portion of said belt includes a ferromagnetic material adjacent said trace for altering an electrical parameter of said monitoring and transmitting device as sa id portion of said belt including ferro magnetic material moves relative to said trace as said belt slides along said track.

15. The product display apparatus of claim 14 wherein movement of said ferro magnetic material with respect to said trace as said belt slides through said track varies said RF receiving frequency of said electronic monitoring and transmitting device.

16. A product display apparatus comprising:

a frame having mounting hooks at one end thereof for attachment of said product display apparatus to a perforated panel and defining a U-shaped track for guiding product packages in a linear path;

said track having an upper leg disposed vertically above a lower leg and joined by a U-shaped section at a distal end of said frame;

a belt slidably mounted within and guided by said track and having a plurality of hooks depending below said lower leg of said track for attachment of product packages; and a spring for reducing the force required for moving said belt through said track.

17. The product display apparatus of claim 16 further including a spring force adjusting device for varying the spring force to adapt the display track apparatus for product packages of different weights.

18. A product display apparatus comprising:

a frame defining a track and having mounting means at one end thereof for attachment of said product display apparatus to panel, wherein the track has an upper leg thereof disposed vertically above a lower leg thereof and joined by a U-shaped section at a distal end of said frame; and a belt guided by said track and having means for attachment of product packages;

wherein the mounting means is detachable from the frame.

19. A product display apparatus comprising:

a frame defining a track and having mounting means at one end thereof for attachment of said product display apparatus to panel; and a belt guided by said track and having means for attachment of product packages;

wherein the mounting means is detachable from the frame.

20. A product display apparatus comprising:

a frame having mounting hooks at one end thereof for attachment of said product display apparatus to a perforated panel and defining a U-shaped track for guiding product packages in a linear path;

said track having an upper leg disposed vertically above a lower leg and joined by a U-shaped section at a distal end of said frame, said upper leg, lower leg, and U-shaped section of said track defining a length of said track; and a belt having a length shorter than said length of said track slidably mounted within and guided by said track for reciprocating motion in said track, and having a plurality of hooks depending below said lower leg of said track for attachment of product packages;

said belt extending around the U-shaped section of the track and having a first end of said belt disposed in the upper leg, and a second end of said belt disposed in the lower leg.

21. The product display apparatus of claim 20 wherein said hooks are rigidly attached to said belt at regularly spaced linear intervals and at a fixed angle relative to said track, to thereby hold product packages attached to the hooks in a regularly spaced neatly appearing fashion with all product packages being uniformly faced at a uniform angle to said track.

22. The product display apparatus of claim 20 further including a wheel journalled in said frame and having an outer surface of said wheel contoured for contacting a side of said belt opposite said hooks for guiding said belt through said U-shaped portion of said track.

23. The product display apparatus of claim 20 wherein the sole motive force for moving said belt through said track is provided by manual human effort.

* * * * *